(12) United States Patent
Wiertz

(10) Patent No.: US 12,280,821 B2
(45) Date of Patent: Apr. 22, 2025

(54) STEERING DEVICE FOR A VEHICLE AND METHOD FOR MEASURING A RACK FORCE ACTING ON A RACK WITH A STEERING DEVICE OF THIS KIND

(71) Applicant: ZF Automotive Germany GmbH, Alfdorf (DE)

(72) Inventor: Alexander Wiertz, Solingen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 212 days.

(21) Appl. No.: 18/295,362

(22) Filed: Apr. 4, 2023

(65) Prior Publication Data

US 2023/0311985 A1 Oct. 5, 2023

(30) Foreign Application Priority Data

Apr. 4, 2022 (DE) .......................... 102022203322.1

(51) Int. Cl.
| | |
|---|---|
| *B62D 15/02* | (2006.01) |
| *F16C 35/06* | (2006.01) |
| *G01L 5/00* | (2006.01) |

(52) U.S. Cl.
CPC .......... *B62D 15/0225* (2013.01); *F16C 35/06* (2013.01); *G01L 5/0038* (2013.01); *F16C 2233/00* (2013.01)

(58) Field of Classification Search
CPC ...... B62D 15/0225; B62D 3/123; B62D 6/10; F16C 35/06; F16C 2233/00; G01L 5/0038; G01L 5/221
See application file for complete search history.

(56) References Cited

U.S. PATENT DOCUMENTS

| | | | |
|---|---|---|---|
| 8,977,434 B2 * | 3/2015 | Yoshimoto .......... | B60T 8/17552 180/197 |
| 2015/0151778 A1 * | 6/2015 | Kageyama ............. | B62D 5/006 701/41 |

* cited by examiner

*Primary Examiner* — Xiao En Mo
(74) *Attorney, Agent, or Firm* — Kristin L. Murphy

(57) ABSTRACT

A steering device for a vehicle, having a rack which is mounted so as to be displaceable in a direction of a longitudinal axis of the rack, having a pinion, wherein the rack meshes with the pinion, having a pressing mechanism, wherein the rack is pressed against the pinion by the pressing mechanism, and having a sensor mechanism. The sensor mechanism is designed at least for measuring a compressive force. To detect or measure a rack force of the rack reliably and/or easily, the steering device is characterized in that a compressive force component directed radially to the longitudinal axis of the rack can be detected or measured by the sensor mechanism.

20 Claims, 3 Drawing Sheets

STEERING DEVICE FOR A VEHICLE AND METHOD FOR MEASURING A RACK FORCE ACTING ON A RACK WITH A STEERING DEVICE OF THIS KIND

CROSS-REFERENCE TO RELATED APPLICATION

This application claims priority to German Patent Application No., 102022203322.1, filed Apr. 4, 2022, the disclosure of which is incorporated herein by reference in its entirety.

TECHNICAL FIELD

The disclosure relates to a steering device for a vehicle and having a rack which is mounted so as to be displaceable in a direction of a longitudinal axis of the rack, and having a pinion, wherein the rack meshes with the pinion, and having a pressing mechanism, wherein the rack is pressed against the pinion by the pressing mechanism, and having a sensor mechanism, wherein the sensor mechanism is designed at least for measuring a compressive force. Furthermore, the disclosure relates to a method for measuring a rack force acting on a rack with a steering device of this kind.

BACKGROUND

A steering device of this kind is known from EP 0 194 003 A1. In this case, an axially acting force of the pinion is detected by piezoelectric transducers, wherein the piezoelectric transducers are assigned to a ball bearing and directly measure the forces acting in the axial direction of the pinion.

However, it is of particular interest for a rack force acting on the rack to be detected. A measurement of the rack forces acting on the rack is important, for example in connection with steer-by-wire steering, since a realistic steering feeling on a steering wheel can be simulated on this basis. In this case, the term steering wheel is synonymous with a steering handle of any shape and/or design. In the case of steer-by-wire steering, a mechanical connection between the steering wheel and the rack for steering wheels of the vehicle can be completely dispensed with. Steering commands are therefore transmitted by a steering unit to an electric motor which displaces the rack to steer the wheels by the pinion. In this case, the rack can adjust a steering angle at the wheels by tie rods. The pinion may be a constituent part of a steering gear connected to the electric motor, on the one hand, and to the rack, on the other. The steer-by-wire steering has a feedback motor which simulates steering forces, in order to provide the driver with feedback on the steering forces which are acting. In the case of a conventional steering system with a mechanical connection between the steering wheel and the rack, the steering feel results due to the specified mechanics. On account of the fact that there is no mechanical connection between the steering wheel and the rack in the case of steer-by-wire steering, the steering feel must be simulated for the driver on the steering wheel. For this purpose, a measured rack force of the rack represents a relevant input variable.

SUMMARY

An issue that occurs is in developing a steering device and/or a method of the kind referred to above, in such a manner that a rack force of the rack can be reliably and/or easily detected or measured. An alternative is needed.

In one exemplary arrangement, a steering device is designed for a vehicle or motor vehicle. The vehicle or motor vehicle comprises the steering device. The steering device has a rack which is mounted so as to be displaceable in a direction of a longitudinal axis of the rack. For example, the rack is mounted so as to be displaceable in the axial direction of the longitudinal axis of the rack. Two ends of the racks facing away from one another may each be connected directly or indirectly to a tie bar, in order to transmit a steering moment to a respective wheel.

Furthermore, the steering device has a pinion. The rack and the pinion mesh with one another. The pinion may be designed as a pinion wheel or as a pinion shaft, and in one exemplary arrangement, as a worm shaft. More specifically, the pinion is enmeshed with a rack or worm wheel, which can be driven by a motor or an electric motor.

The steering device has a pressing mechanism, wherein by operation of the pressing mechanism, the rack is pressed against the pinion. Moreover, the steering device has a sensor mechanism, wherein the sensor mechanism is designed at least for measuring a compressive force. The sensor mechanism is designed in such a manner and/or arranged so that a compressive force component directed radially to the longitudinal axis of the rack can be detected or measured by the sensor mechanism, for example is detected or measured.

It is advantageous in this case that due to the detection and/or measurement of the compressive force component directed radially to the longitudinal axis of the rack, the rack force acting in the axial direction of the longitudinal axis of the rack is not determinable and/or determined directly, but indirectly. This gives rise to new possibilities for detecting and/or measuring the rack force of the rack reliably and/or easily. The compressive force component directed radially to the longitudinal axis of the rack, the rack force acting in the axial direction of the longitudinal axis of the rack can be inferred. For example, the rack force acting in the axial direction of the longitudinal axis of the rack can be determined and/or calculated by the compressive force component directed radially to the longitudinal axis of the rack.

The compressive force component represents a separating force and/or separating force component acting between teeth of the rack and teeth of the pinion. During the transmission of a force and/or a torque from the pinion to the rack, the separating force is produced between the teeth of the rack and the teeth of the pinion. In order to transmit the force and/or the torque from the pinion to the rack, the teeth of the rack mesh with the teeth of the pinion. Due to the compressive force component and by operation of an evaluation device, a rack force acting on the rack can be determined or calculated.

The rack force is directed in an axial direction of the longitudinal axis of the rack. The rack force may act as a compressive and/or tensile force in the direction of the longitudinal axis of the rack. In one exemplary arrangement, a rack force acts in a longitudinal direction of the rack when said rack is activated by the pinion. Furthermore, wheels of the vehicle connected to the rack may introduce a force into the rack which determines the rack force and/or contributes thereto. The compressive force component detected and/or measured by the sensor mechanism is proportionate to the rack force. Consequently, the rack force can easily be determined by detecting the compressive force component.

According to a development, the sensor mechanism has a pressure sensor or a piezo pressure sensor. By operation of a sensor designed in this way, the compressive force component can be detected and/or measured directly. The piezo pressure sensor may be designed as a piezoresistive or piezoelectric pressure sensor. The sensor mechanism is connected to an, or to the, evaluation device. Due to the evaluation device, a control system can be conducted to a feedback motor, as a result of which in the case of steer-by-wire steering, for example, steering forces can be simulated on a steering wheel.

According to a further exemplary arrangement, the pressing mechanism comprises the sensor mechanism. For example, a pressure sensor is received and/or integrated in the pressing mechanism. Due to the arrangement of the sensor mechanism in the pressing mechanism, the installation space required for the sensor mechanism can be reduced to a minimum. In addition, the sensor mechanism can be mounted along with the pressing mechanism, as a result of which the amount of assembly work is reduced.

According to a development, the pressing mechanism has a pressure piece. The pressure piece is guided displaceably within a housing and in the axial direction of a center longitudinal axis of the housing and/or of the pressure piece. For example, the steering device comprises the housing. The housing may have or form a housing interior. The housing interior may be realized as a recess and/or bore. In one exemplary arrangement, the housing interior has a hollow cylindrical design. The pressure piece may have an outer circumference designed to correspond to the housing interior, for example, being cylindrical. The housing interior and/or the pressure piece may have or define the center longitudinal axis. The center longitudinal axis of housing interior may coincide with the center longitudinal axis of the pressure piece.

Furthermore, the pressing mechanism may have a bearing element fixed to the housing in an axial direction to the center longitudinal axis. In this case, the sensor mechanism is arranged between the pressure piece and the bearing element. The bearing element may be designed as a cover and/or as a lid for the housing interior and/or for closing off the housing interior. In one exemplary arrangement, the bearing element is arranged at an end of the pressure piece facing away from the rack. The bearing element may have a screw thread, for example, an outer thread, for screwing in and/or fixing in an opening of the housing interior. For this purpose, the opening and/or the housing interior may have an inner thread designed to correspond to the outer thread.

The sensor mechanism rests directly against the pressure piece and/or directly against the bearing element. The sensor mechanism may have a disk-like or circular disk-shaped design. In one exemplary arrangement, an outer circumference of the sensor mechanism corresponding to an outer circumference of the pressure piece is designed. The sensor mechanism is guided along with the pressure piece displaceably in the axial direction of the center longitudinal axis of the housing and/or of the pressure piece.

According to a development, the pressing mechanism has a pretensioning element acting in the axial direction of the center longitudinal axis. The pretensioning element may be designed as a spring, for example as a compressive spring and/or a helical spring. Due to the pretensioning element arranged between the bearing element and the pressure piece, the pressure piece is acted upon by a pretensioning force in the axial direction to the center longitudinal axis and directed away from the bearing element. In this way, due to the pressure piece, the rack can be pressed against the pinion. The pretensioning element rests, on the one hand, on the sensor mechanism and, on the other hand, either on the pressure piece or on the bearing element. By operation of the sensor mechanism, for example a pressure sensor or piezo-pressure sensor, the compressive force component which results in the axial direction of the center longitudinal axis of the pressing mechanism can be detected and/or measured.

The pressing mechanism may have a sliding element. In this case, the sliding element is arranged on a side of the pressure piece facing away from the pretensioning element for applying to the rack. During operation, the rack may be displaced by the pinion in the longitudinal direction of the rack, in order to steer wheels.

In this case, the rack glides along the sliding element and is simultaneously pressed against the pinion. The sliding element has an arc-shaped portion-like or substantially arc-shaped portion-like cross section. This cross section is designed to be applied to the correspondingly designed rack. Alternatively, a sliding element of this kind may be used so that the sliding element only realizes a linear contact to the rack.

According to a further exemplary arrangement, a damping element, for example, a damping ring, is arranged between the sensor mechanism and the pressure piece or the bearing element. The damping element lies on a side of the sensor mechanism facing away from the pretensioning element of the pressing mechanism. The damping element may, on the one hand, rest against the sensor mechanism and, on the other hand, rest against the pressure piece or the bearing element.

In accordance with a development, the sensor mechanism has a pressure sensor and at least one further sensor. The further sensor may be designed as a temperature sensor or as a moisture sensor. Consequently, the sensor mechanism may satisfy multiple sensory functions. In this case, it is advantageous for only a single sensor mechanism to have to be arranged in the steering device or integrated therein.

A method for measuring a rack force acting on the rack in the case of a steering device according to the disclosure, is also disclosed. In this case, the compressive force component directed radially to the longitudinal axis of the rack is detected or measured by the sensor mechanism. Due to the compressive force component, a separating force acting between teeth of the rack and teeth of the pinion is represented, wherein the rack force acting on the rack is determined or calculated by the compressive force component and by an evaluation device.

The method according to the exemplary arrangements are explained in connection with the steering device according to the disclosure described here is developed.

BRIEF DESCRIPTION OF DRAWINGS

The disclosure is explained in greater detail below with the help of the figures. In this case, the same reference signs relate to the same, similar or functionally identical components or elements. In the drawing.

DETAILED DESCRIPTION

Figure 1:
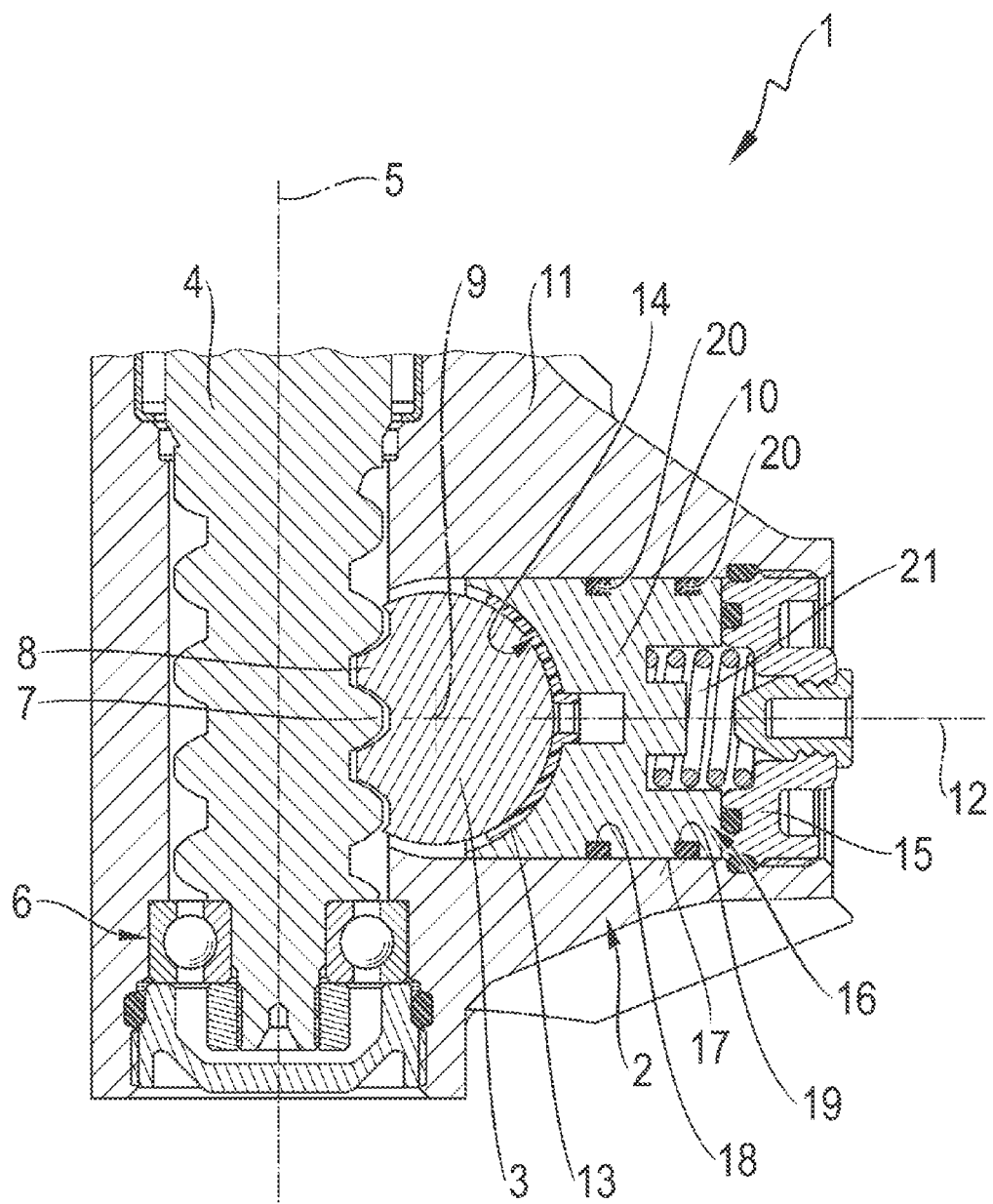
FIG. 1 shows a detail of a sectional side view of a steering device according to the prior art.

FIG. 1 shows a detail of a sectional side view of a steering device 1 according to the prior art. The steering device 1 is designed for a vehicle not depicted in greater detail here. The steering device 1 has a pressing mechanism 2. The pressing mechanism 2 is designed for pressing a rack 3 on a pinion 4. The pinion 4 is designed as a pinion shaft in this exemplary arrangement. The pinion 4 is mounted rotatably about a center axis 5 of the pinion 4. For this purpose, one end of the pinion 4 is received in a ball bearing 6. The pinion 4 and the rack 3 mesh with one another. For this purpose, teeth 7 of the pinion 4 interact with teeth 8 of the rack 3. For greater clarity, not all teeth 7, 8 are provided with a reference sign.

The pinion 4 can be driven by an electric motor not depicted in greater detail here. Due to a rotation of the pinion 4 about the center axis 5 and the meshing of pinion 4 and rack 3 with one another, the rack 3 is displaceable in the direction of a longitudinal axis 9 of the rack 3.

The pressing mechanism 2 is arranged on a side of the rack 3 facing away from the pinion 4. The pressing mechanism 2 has a pressure piece 10. The pressure piece 10 is mounted displaceably within a housing 11 of the steering device 1 in an axial direction of a center longitudinal axis 12 of the housing 11 or of the pressure piece 10. Between the pressure piece 10 and the rack 3 is arranged a sliding element 13 in this exemplary arrangement. During operation, the rack 3 may be displaced by the pinion 4 in the direction of the longitudinal axis 9 of the rack 3, in order to steer wheels not depicted in greater detail here. In this case, the rack 3 slides along the sliding element 13 and is simultaneously pressed by the pressure piece 10 against the pinion 4. In this case, the sliding element 13 is held on the pressure piece 10. The sliding element 13 in this exemplary arrangement has a substantially arc-shaped portion-like cross section which allows a partial enclosure or resting against the correspondingly designed rack 3. Furthermore, the sliding element 13 is arranged in a recess 14 in the pressure piece 10 which is designed to correspond to the sliding element 13.

The pressing mechanism 2 has a bearing element 15 which is fixed to the housing 11. The bearing element 15 is arranged on, and fastened to, the housing 11 on a side facing away from the rack 3. In this exemplary arrangement, the bearing element 15 is designed as a kind of lid which closes off a housing interior 16 of the housing 11. The housing interior 16 has a hollow cylindrical design in this exemplary arrangement. Corresponding to this, the pressure piece 10 has a cylindrical outer face 17. In the outer face 17 of the pressure piece 10, two circulating grooves 18, 19 are formed in this exemplary arrangement. A seal 20 is arranged in each of the grooves 18, 19 and interacts with an inner wall or an outer circumference of the housing interior 16. The seal 20 in this exemplary arrangement is realized as an O-ring in each case.

Furthermore, the pressing mechanism 2 has a pretensioning element 21 acting in an axial direction to the center longitudinal axis 12. The pretensioning element 21 is designed as a compression spring or helical spring in this exemplary arrangement. In this case, the pretensioning element 21 is arranged between the pressure piece 10 and the bearing element 15. In this case, the pressure piece 10 is acted upon by the pretensioning element 21 by a pretensioning force in an axial direction to the center longitudinal axis 12 and directed away from the bearing element 15, as a result of which the pressure piece 10 is pressed against the rack 3 and said rack is therefore pressed against the pinion 4.

Figure 2:
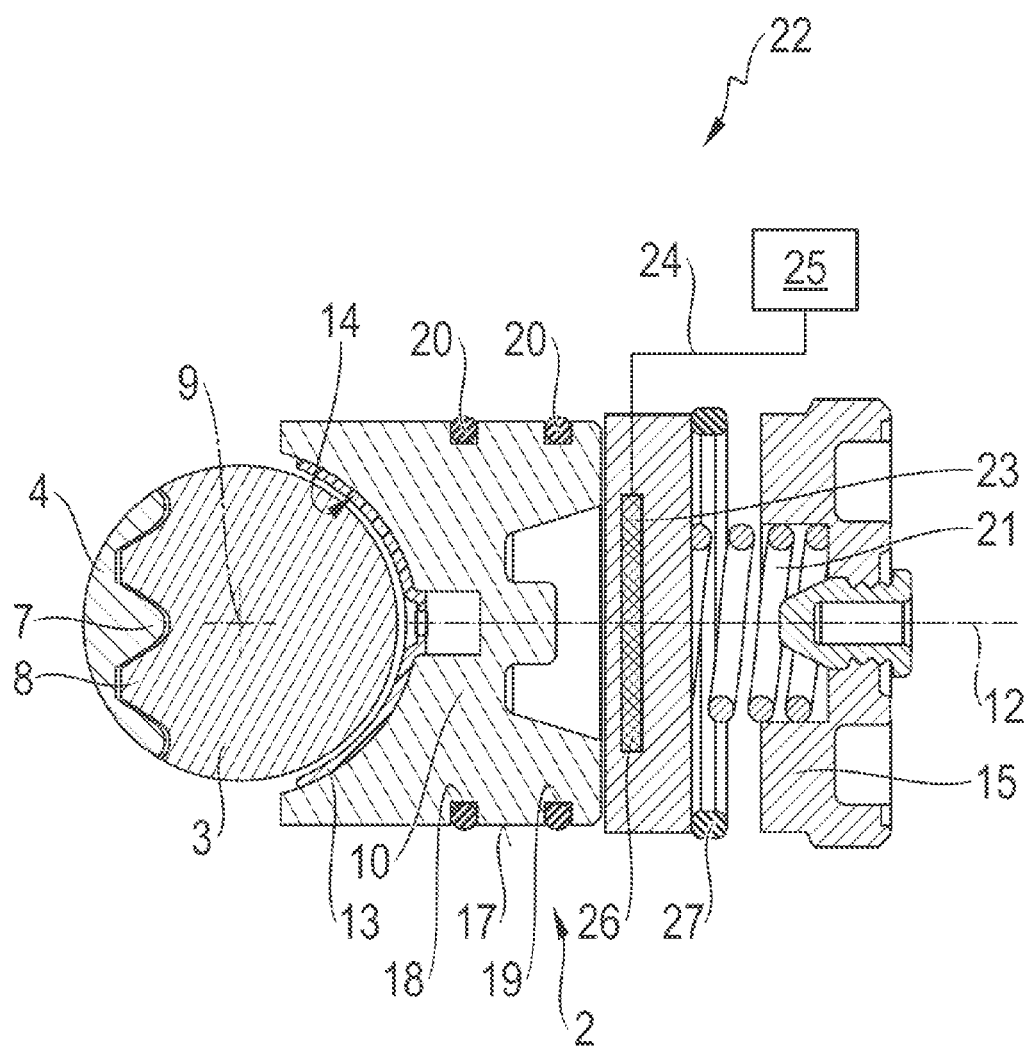
FIG. 2 shows a detail of a sectional side view of a first steering device according to the disclosure.

FIG. 2 shows a detail of a sectional side view of a first steering device 22 according to the disclosure. With regard to the design in principle of the steering device 22, reference is also made to the previously described steering device 1. In this case, the same features have the same reference signs as previously. The housing 11 is omitted in this case, in the interests of greater clarity.

Unlike the steering device 1 according to FIG. 1, the steering device 22 according to the disclosure depicted here has a sensor mechanism 23. The sensor mechanism 23 is designed for measuring a compressive force. A compressive force component directed radially to the longitudinal axis 9 of the rack 3 can be detected in this case by the sensor mechanism 23. In this exemplary arrangement, the compressive force component is oriented axially to the center longitudinal axis 12.

The compressive force component that can be detected or measured by the sensor mechanism 23 represents a separating force or separating force component acting between the teeth 7 of the pinion 4 and the teeth 8 of the rack 3. The sensor mechanism 23 is connected by a line 24 to an evaluation device 25 only depicted here schematically. The sensor mechanism 23 has a pressure sensor 26 only indicated schematically here. The pressure sensor 26 is designed as a piezo-pressure sensor in this case.

The compressive force component that can be determined by the sensor mechanism 23 is proportionate to a rack force acting in the axial direction of the longitudinal axis 9 of the rack 3. Consequently, the rack force acting on the rack 3 can be determined by the compressive force component and the evaluation device.

In this exemplary arrangement, the sensor mechanism 23 is designed as an integral part of the pressing mechanism 2. In this case, the sensor mechanism 23 or the pressure sensor 26 is received or integrated in the pressing mechanism 2. For this purpose, the sensor mechanism 23 is arranged between the pressure piece 10 and the bearing element 15, In this exemplary arrangement, the sensor mechanism 23 rests directly against the pressure piece 10. The pretensioning element 21 in this exemplary arrangement is supported against a side of the sensor mechanism 23 facing away from the pressure piece 10. Furthermore, the pretensioning element 21 is supported by the bearing element 15. The sensor mechanism 23 in this case has a plate-like design, by way of example.

In this exemplary arrangement, the pressing mechanism 2, and unlike the steering device 1 according to FIG. 1, has a damping element 27 which is designed as a damping ring in this case. The damping element 27 is arranged between the sensor mechanism 23 and the bearing element 15 in this case. Consequently, the damping element 27 rests against a side of the sensor mechanism 23 facing the pretensioning element 21.

Figure 3:
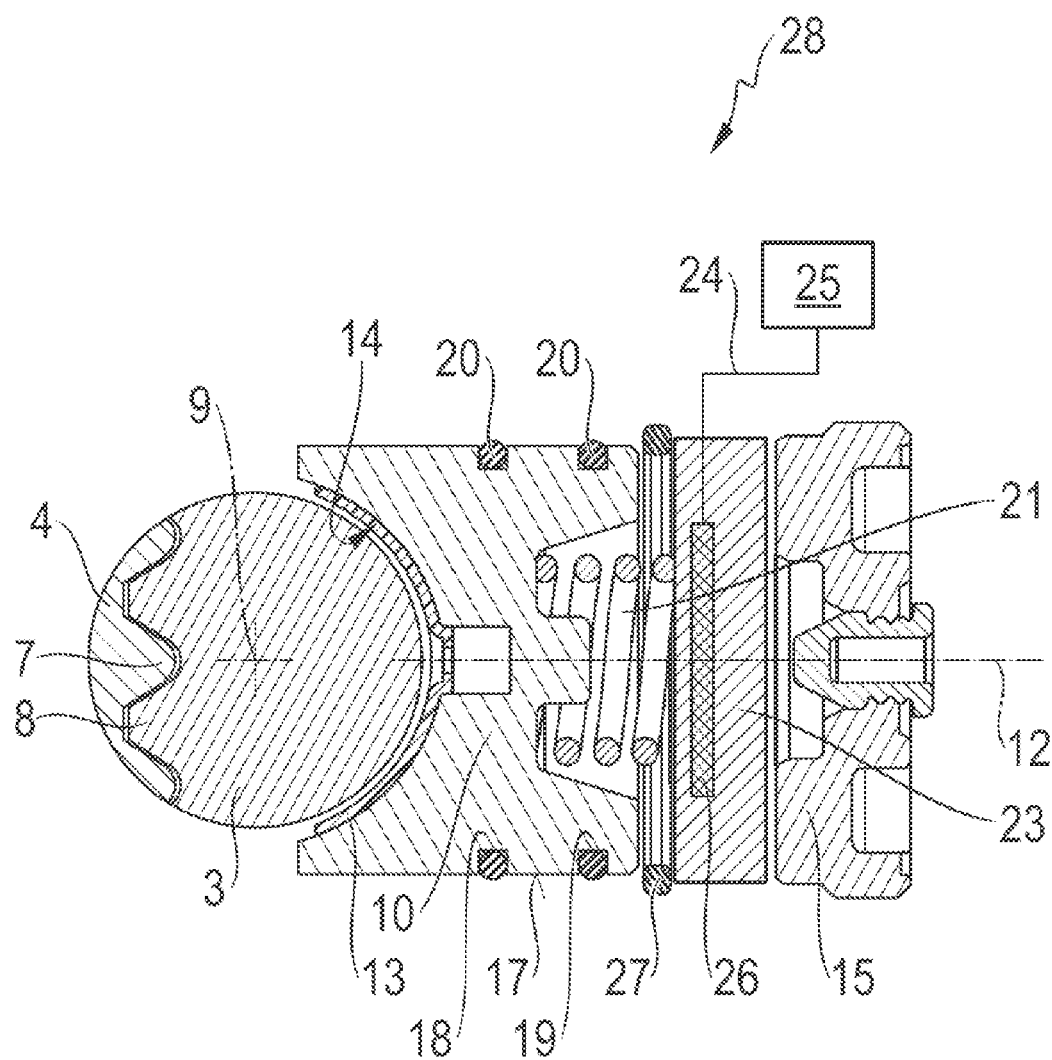
FIG. 3 shows a detail of a sectional side view of a f according to the disclosure.

FIG. 3 shows a detail of a sectional side view of a further steering device 28 according to the disclosure. The same features have the same reference signs as before. To this extent, reference is also made to the preceding description, in order to avoid repetition.

Unlike the steering device 22 or the pressing mechanism 2 according to FIG. 2, the sensor mechanism 23 in the case of the steering device 28 shown here rests directly against the bearing element 15. The pretensioning element 21 in this exemplary arrangement is supported against a side of the sensor mechanism 23 facing away from the bearing element 15 and the pressure piece 10. In this case, the damping element 27 is arranged between the sensor mechanism 23 and the pressure piece 10.

The invention claimed is:

1. A steering device for a vehicle, comprising: a rack which is mounted so as to be displaceable in a direction of a longitudinal axis of the rack, a pinion, wherein the rack meshes with the pinion, a pressing mechanism, wherein the rack is pressed against the pinion by the pressing mechanism, and a sensor mechanism, wherein the sensor mechanism is designed at least for measuring a compressive force, wherein a compressive force component directed radially to the longitudinal axis of the rack can be detected or measured by the sensor mechanism.

2. The steering device as claimed in claim 1, wherein the compressive force component represents a separating force acting between teeth of the rack and teeth of the pinion, wherein a rack force acting on the rack can be determined by the compressive force component and by an evaluation device.

3. The steering device as claimed in claim 1, wherein the sensor mechanism has a pressure sensor or a piezo pressure sensor, the sensor mechanism is connected to an evaluation device.

4. The steering device as claimed in claim 1, wherein the pressing mechanism comprises the sensor mechanism.

5. The steering device as claimed in claim 1, wherein the pressing mechanism has a pressure piece, wherein the pressure piece is guided displaceably within a housing and in an axial direction of a center longitudinal axis of the housing and/or of the pressure piece, and that the pressing mechanism has a bearing element fixed to the housing in an axial direction to the center longitudinal axis, wherein the sensor mechanism is arranged between the pressure piece and the bearing element.

6. The steering device as claimed in claim 5, wherein the sensor mechanism rests directly against the pressure piece and/or directly against the bearing element.

7. The steering device as claimed in claim 5, wherein the pressing mechanism has a pretensioning element acting in the axial direction of the center longitudinal axis, wherein the pretensioning element arranged between the bearing element and the pressure piece the pressure piece is acted upon by a pretensioning force in the axial direction to the center longitudinal axis and directed away from the bearing element, and the pretensioning element rests, on the one hand, on the sensor mechanism and, on the other hand, on the pressure piece or on the bearing element.

8. The steering device as claimed in one of claims 5, wherein a damping element, is arranged between the sensor mechanism and the pressure piece or the bearing element, the damping element resting against a side of the sensor mechanism facing the pretensioning element of the pressing mechanism.

9. The steering device as claimed in claim 1, wherein the sensor mechanism has a pressure sensor and at least one further sensor.

10. A method for measuring a rack force acting on a rack of a steering device according to claim 1, wherein a compressive force component directed radially to the longitudinal axis of the rack is detected by the sensor mechanism and by the compressive force component, a separating force acting between teeth of the rack and teeth of the pinion is represented, wherein the rack force acting on the rack is determined by the compressive force component and by an evaluation device.

11. The steering device as claimed in claim 2, wherein the compressive force component is proportionate to the rack force, the rack force acting as a compressive and/or tensile force in the direction of the longitudinal axis of the rack.

12. The steering device as claimed in claim 2, wherein the sensor mechanism has a pressure sensor or a piezo pressure sensor, the sensor mechanism is connected to the evaluation device.

13. The steering device as claimed in claim 12, wherein the pressing mechanism comprises the sensor mechanism.

14. The steering device as claimed in claim 13, wherein a pressure sensor is received and/or integrated in the pressing mechanism.

15. The steering device as claimed in claim 12, wherein the pressing mechanism has a pressure piece, wherein the pressure piece is guided displaceably within a housing and in an axial direction of a center longitudinal axis of the housing and/or of the pressure piece, and that the pressing mechanism has a bearing element fixed to the housing in an axial direction to the center longitudinal axis, wherein the sensor mechanism is arranged between the pressure piece and the bearing element.

16. The steering device as claimed in claim 6, wherein the sensor mechanism has a disk-like or circular disk-shaped design.

17. The steering device as claimed in claim 6, wherein the pressing mechanism has a pretensioning element acting in the axial direction of the center longitudinal axis, wherein the pretensioning element arranged between the bearing element and the pressure piece the pressure piece is acted upon by a pretensioning force in the axial direction to the center longitudinal axis and directed away from the bearing element, and the pretensioning element rests, on the one hand, on the sensor mechanism and, on the other hand, on the pressure piece or on the bearing element.

18. The steering device as claimed in one of claims 6, wherein a damping element, is arranged between the sensor mechanism and the pressure piece or the bearing element, the damping element resting against a side of the sensor mechanism facing the pretensioning element of the pressing mechanism.

19. The steering device as claimed in claim 18, wherein the sensor mechanism has a pressure sensor and at least one further sensor.

20. The steering device as claimed in claim 9, wherein the further sensor is designed as a temperature sensor or as a moisture sensor.

\* \* \* \* \*